April 21, 1959      J. R. PINKHAM      2,882,911
METHOD AND APPARATUS FOR CURING TOBACCO
Filed June 10, 1957      3 Sheets-Sheet 2

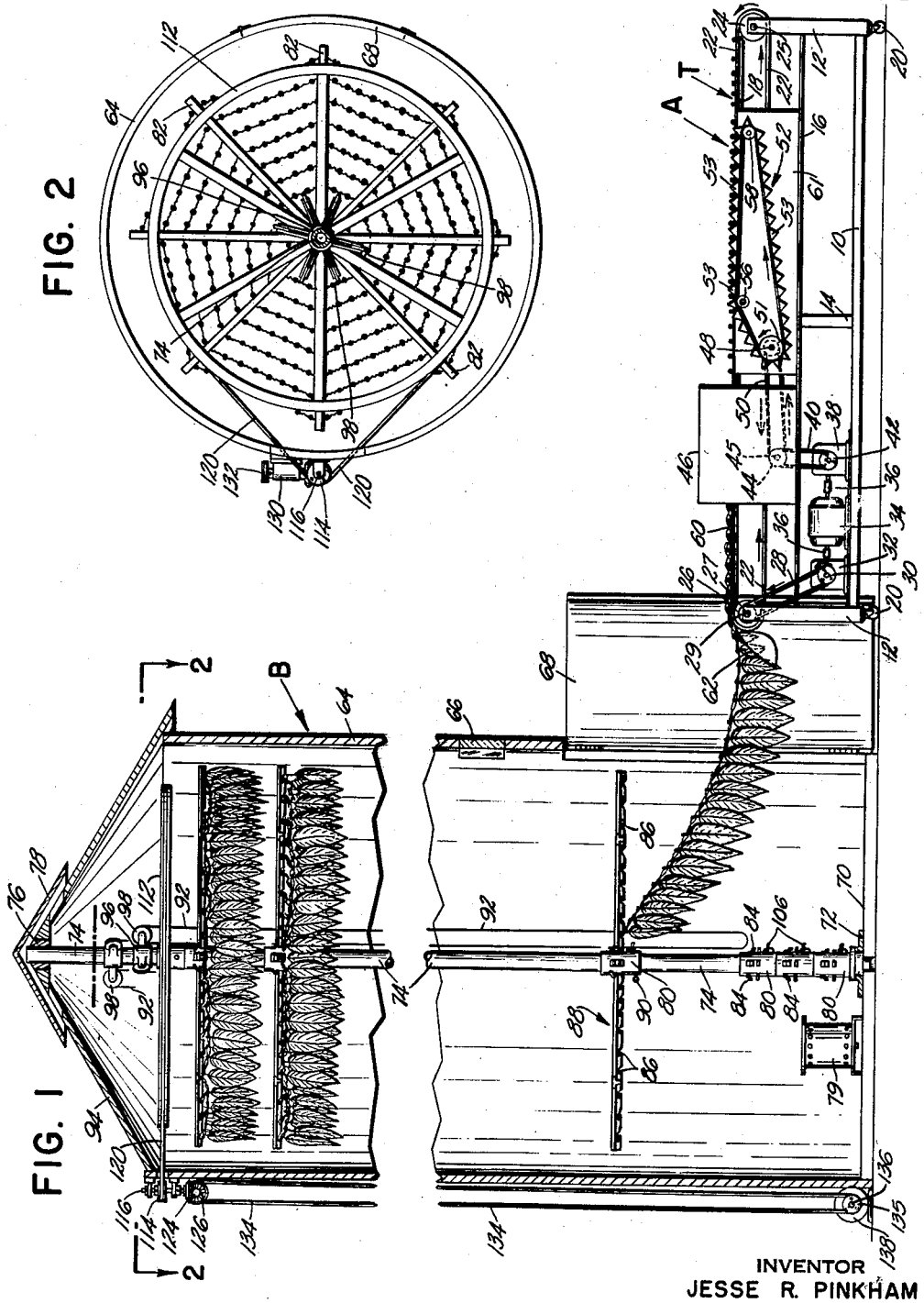

INVENTOR
JESSE R. PINKHAM
BY
ATTORNEY

April 21, 1959 J. R. PINKHAM 2,882,911
METHOD AND APPARATUS FOR CURING TOBACCO
Filed June 10, 1957 3 Sheets-Sheet 3

INVENTOR
JESSE R. PINKHAM
BY
ATTORNEY

United States Patent Office 2,882,911
Patented Apr. 21, 1959

2,882,911

METHOD AND APPARATUS FOR CURING TOBACCO

Jesse R. Pinkham, Raleigh, N.C., assignor to American Machine & Foundry Company, a corporation of New Jersey Application June 10, 1957, Serial No. 664,717

16 Claims. (Cl. 131—136)

This invention relates to an apparatus and method for curing and handling tobacco.

Curing methods in use today vary slightly from those used decades ago. In the tobacco curing process, it has been the practice to either loop leaves with a string on opposite sides of a curing stick or to tie the green leaves in bundles, mounting the bundles straddle-fashion on sticks along the length of the stick. These sticks are then placed on racks in curing barns where warm air is circulated through the leaves. This method consumes many man hours of labor and has resulted in leaf damage due to excess handling.

It is essential that the leaves be uniformly dried and that no excess moisture remains to cause mold or rot when, during the next process, the tobacco leaves are packed in hogsheads for aging. It is equally important that the leaves are not damaged through overheating, overdrying or through excess handling.

It is an object of this invention to provide a more efficient method for handling and curing tobacco leaves.

Another object is to provide a curing apparatus that will accommodate and cure a greater quantity of tobacco within a relatively small curing compartment.

A further object is to minimize the amount of leave handling required during the curing process.

A further object is to eliminate the use of tobacco curing sticks in the curing process.

A further object is to reduce the damage resulting from scalding and bruising leaves.

A further object is to facilitate even spacing of leaves in the curing compartment, permitting more uniform cures.

Another object is to render the cured produce convenient to pack and prepare for grading.

Another object is to provide a convenient and economical structure for efficient curing of green tobacco.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Fig. 1 is a sectional side view of the green tobacco handling and curing apparatus.

Fig. 2 is a plan view of a leaf support frame within the curing chamber, taken on line 2—2 of Fig. 1 with roof removed.

Figure 3:
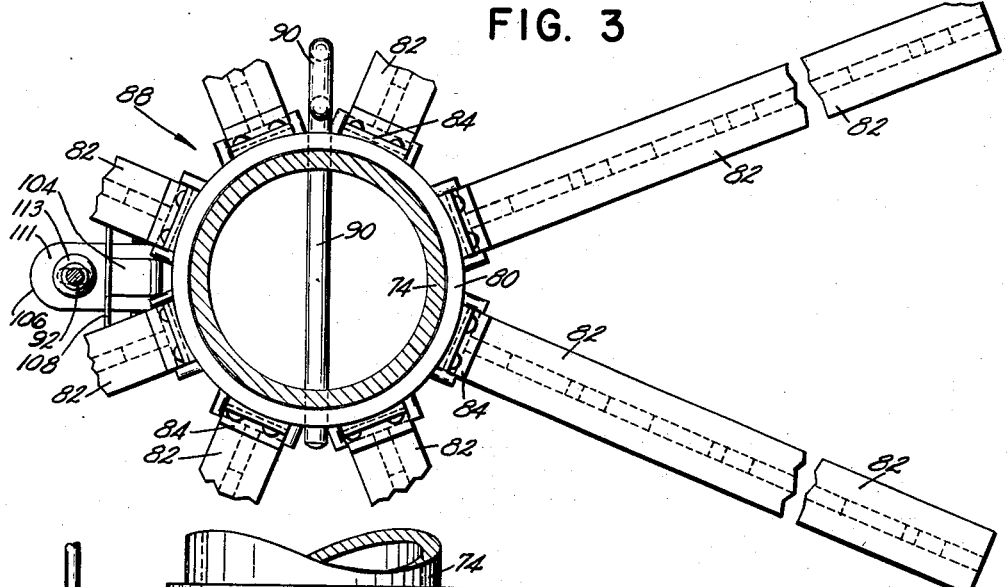
Fig. 3 is a partial sectional plan view of the leaf support frame.

In the apparatus employed to illustrate the invention, I have shown in Fig. 1 a tobacco leaf conveyor, spacer and stitcher in operating position at the curing barn entrance. A movable table A, containing those elements, consists of a horizontal base 10 supporting two vertical end members 12 and a shorter vertical center bracket 14. A horizontal frame support 16 is attached to the midpoints of the vertical end members 12 and the center of said horizontal frame support 16 rests upon and is securely attached to the top end of the vertical center bracket 14. A belt supporting member 18 is attached to the upper portion of the vertical end members 12, and four casters 20 are mounted at the base of said vertical end members 12, rendering the table movable.

Green tobacco leaves T are placed side by side on a suitable leaf conveyor 22 which may consist of a wide belt and rollers for feeding a supply of leaves, the leaf stems all facing in one direction. The conveyor 22 travels in the direction indicated by the arrows over roller 24 and roller 26 fixedly mounted on shafts 25 and 27, respectively. The shafts 25 and 27 are supported in bearings at the upper ends of vertical end members 12. While I have shown a conveyor belt 22 consisting of a wide belt and rollers, it will be appreciated that such conveyor may be composed of a plurality of belts and pulleys or sprockets and chains.

The shaft 27 on which roller 26 is fixedly mounted also has a pulley 29 fixed thereon. An endless belt 28 travels over pulley 29 and drive pulley 30. The drive pulley 30 is mounted on the output shaft of a conventional reduction gear unit 32 which in turn is powered by an electric motor 34. The opposite end of the shaft 36 of motor 34 powers another reduction gear unit 38, the output shaft of which drives a pulley 42. A belt 40 traveling over driven pulley 42 drives one of the pulleys of a dual pulley 44 fixedly mounted on shaft 45. A suitable sewing or looping machine 46, not the subject of this invention, such as a standard two thread chain stitching machine, manufactured by Singer Sewing Company known as Models 157–3 and 157–4, is positioned on the movable table with its looping or stitching head in the path of travel of the tobacco stems. The shaft 45 drives the looping machine 46. While stem spacing may be done manually, I have shown how that operation may efficiently be accomplished mechanically. The other pulley of dual pulley 44 has a belt 50 traveling thereover which in turn drives pulley 51. The pulley 51 is fixedly mounted on a shaft 48. Also mounted on a shaft 48 is a suitable roller or pulley over which the endless spacer conveyor 52 travels.

The endless stem spacer conveyor 52 is provided with suitable spacing elements 53 and travels over a suitable pulley or roller (not shown) fixedly mounted on shaft 48 and also over freely mounted pulleys 56 and 58 supported on the side plate 61. The upper run of conveyor 52 extends along a path which is parallel and in the plane as conveyor belt 22, from which the stems project. The stem spacer conveyor 52 traveling in the direction indicated by the arrows engages the stems of the leaves supported on the leaf conveyor 22 and spaces them so that they may be joined in a chain with preferably a chain stitch or loop as performed by any suitable sewing or tying device 46. The chain of stitched or looped leaves 60 emerges from the stitching device 46 and slides down leaf slide 62.

A curing barn B, shown in Fig. 1, may be of any suitable shape and my invention could be used to advantage in a conventional curing barn. The cylindrical curing barn B used to illustrate the invention may be ten feet in diameter and approximately twenty feet tall. A convenient and economical curing barn shell 64 could for example be constructed of corrugated, galvanized sheets of suitable gauge, rendering it self-supporting without the necessity for framing. The cylindrical shell 64 may be provided with a window 66 for observation purposes and a door 68 for access and loading.

A base 70 for the above described housing has at its center a pivot bearing point 72 to accommodate a central shaft 74 whose uppermost end is rotatably supported at the apex 76 of a conical roof cap 78. A suitable heating means 79 not the subject of this invention provides the heat necessary for curing the green tobacco leaves.

Figure 4:
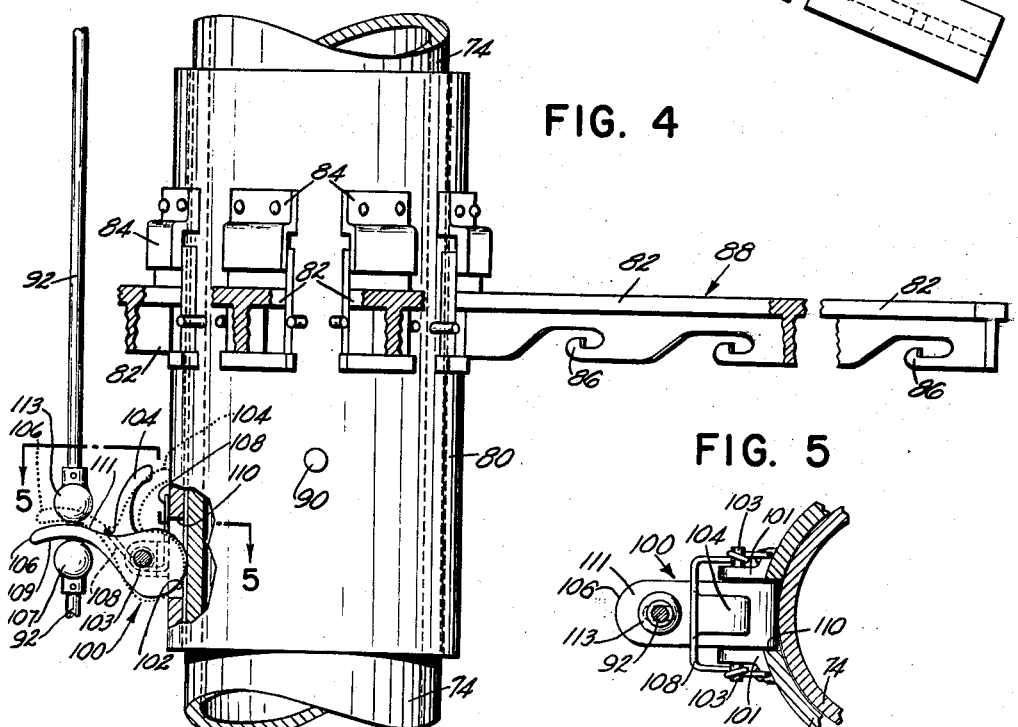
Fig. 4 is a side elevation of the same.
Figure 5:
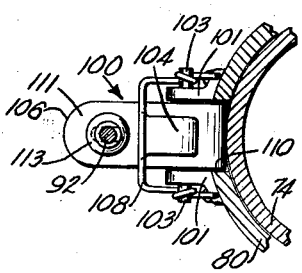
Fig. 5 is a partial detailed plan view of a hub locking member, taken on line 5—5 of Fig. 4.

In Figs. 3 and 4 I have shown how leaf support frame hubs 80 may be slidably mounted on the vertical central mainshaft 74. Fig. 4 indicates how removable spokes 82 may be attached to said hubs by engaging the ends of spokes 82 with suitable brackets 84 integrally formed on the hubs 80, to accommodate a plurality of spokes 82.

The spokes 82 themselves may have suitable attaching means 86 such as hooks or notches to support a hanging chain of tobacco leaves 60.

Figure 7:
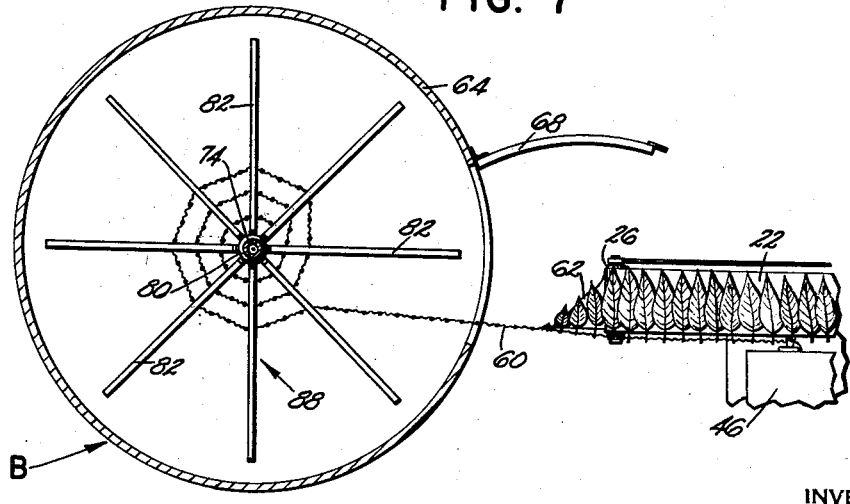
Fig. 7 is a sectional plan view illustrating continuous feeding of green leaves to a leaf support frame within a curing barn.

As the spokes 82 are joined to the hubs 80, the resultant lead frame assumes the appearance of a spider. Figs. 1 and 7 show how the first or uppermost hub 80 is kept in loading position by a removable pin 90 piercing the hub 80 and mainshaft 74 at a suitable working height from the barn floor or base 70.

The beginning of the leaf chain 60, as it emerges from the leaf chain slide 62, is guided through the barn door 68 to the center and bottom of a leaf support frame 88 where it is secured under the frame 88 to a hook or notch 86. The frame 88 is then rotated slowly and winds the leaf chain 60 in an involute. While I have shown involute winding of the chain, any winding and hanging method may be used that will offer the leaves sufficient space for circulation of warm air and which will afford a maximum leaf capacity for each frame 88.

As each leaf frame 88 is filled, the leaf chain 60 is severed and tied. The new loose end is then secured to the center of the next prepared empty frame 88. The filled frame 88 is then slidably raised up the mainshaft 74 by the use of a pulley 98 and hoist rope 92 as shown in Fig. 1 to the uppermost part of the curing barn 64 where it is locked securely onto the mainshaft 74 at the desired height.

I have shown how a leaf frame 88 may be raised into curing position and lowered by the use of an individual rope hoist 92. At the upper end of the mainshaft 74 within the roof dome 94, two hoist pulley collars 96 are integrally joined to the mainshaft 74, one above the other. Each hoist pulley collar 96 supports several pulleys 98 affixed to it in a suitable manner. The pulleys 98 on the upper collar 96 are staggered with respect to the pulleys 98 on the lower collar 96, so that the ropes traveling over each pulley 98 have an unhindered vertical plane in which to travel down to the hoist operator below.

There are as many hoist pulleys 98 positioned at the top of the mainshaft 74 as there are hubs 80. While it will be appreciated that each hub 80 has its own hoist pulley 98 and endless rope 92, for purpose of clarity I have shown only one such hoist pulley 98 and endless rope 92 traveling over said pulley 98, since the other pulleys and ropes operate in the same manner.

A frame hub lock mechanism 100, consisting of an eccentric cam member 102 having a stop arm 104 and an actuating arm 106, is affixed to the hub 80. The cam member 102 is pivotally supported by a stud shaft 103 held by a bracket 101 secured to hub 80. The actuating and support arm 106 contains a hole to allow the hoist rope 92 to pass therethrough. The under portion of said actuating and support arm 106 has on its lowerside a concave contour 109 and on its upperside a convex contour 111. A spherical lug 107 engages with the concave surface 109 while spherical lug 113 engages with convex surface 111. Lugs 107 and 113 are fixedly secured to the rope 92.

In order to raise a leaf frame 88, one side of the rope 92 is pulled to cause the fixed lug 107 to travel upwardly. When the lug 107 engages the lower or concave surface 109 of the actuating arm 106, it lifts the actuating arm 106 to the dotted position shown in Fig. 4. The distance the actuating arm 106 can pivot is limited by the stop arm 104 which is integral with arm 106 and engages, during the lifting operation with the side of the hub 80 as shown in dotted outline in Fig. 4.

A continued pull on the rope 92 causes the lug 107, engaging with the actuating arm 106, to commence through its pivot 103 to elevate the hub 80 upwardly on the shaft 74. The arm 106 actuates an eccentrically mounted cam 102 which is mounted on the pivot 103 so that as the arm 106 is elevated upwardly, the cam 102 disengages from the shaft 74. When no pressure is exerted on the arm 106, it moves downwardly, under the action of spring 108, relative to the hub shell 80 assuming the position in full lines in Fig. 4 which is locked position.

The locking action is effected when the high cam surface of cam 102 engages with the shaft 74 through a slot 110 formed in the frame hub sleeve 80. As indicated hereinbefore, the actuating arm 106 is urged into a horizontal position by the spring 108 which causes the cam 102 to engage with the shaft 74 in the manner indicated. The locking action may be assisted by a downward pull on connection 107 which is fixed to the rope 92 at a suitable distance above the actuating arm 106 to cause the connection 107 to pull downwardly on the actuating arm 106. This aids in effecting a positive lock of the cam 102 against the shaft 74.

The locking action is further assisted by the weight of the loaded leaf frame 88 since the frictional contact between the cam 102 and the shaft 74 will cause the cam 102 to more tightly grip the shaft 74 as the hub 80 travels downwardly. The downward force exerted by the weight of the hub sleeve 80 is greater than the force exerted by the spring 108 so that when the rope 92 is pulled upwardly it will cause the actuating arm 106 to tension the spring 108 in moving to its dotted position without causing the sleeve 80 to be elevated. When the cam 102 has been disengaged from the shaft 74 in this manner, the hub 80 supporting the spokes 82 is ready to be lowered. The lowering operation merely consists of gently lowering the hub 80 so that sufficient tension is applied during this process to the actuating arm 106 to maintain the cam 102 out of engagement with the shaft 74.

After the first hub 80 with its spokes 82 has been filled and raised into curing position, spokes of the next hub 80 are then filled in a similar manner and it is raised and locked to the mainshaft 74 at a point beneath the first hub. This procedure is repeated until the last leaf laden frame is filled.

In order to obtain a proper cure for all leaves wherever located, I have devised a method for slowly rotating the central mainshaft 74 and attached leaf frames 82, thereby circulating the rising warm air through all the hanging leaves, exposing all said leaves to the same curing conditions. Scalding and bruising leaves are avoided by rotating the leaf frames so that overheating or underheating is substantially eliminated.

Figure 6:
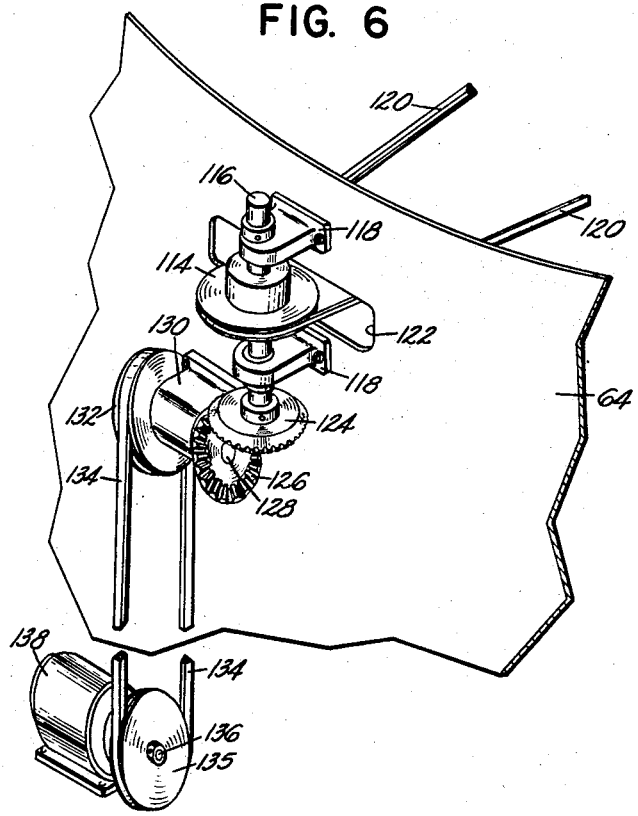
Fig. 6 is a perspective view of the leaf support frame turning mechanism.

I have shown in Figs. 1, 2 and 6 how the vertical mainshaft 74 may be rotated by a large diameter horizontally rotating pulley 112 mounted on the upper end of the mainshaft 74. A horizontally rotating pulley 114 fixedly mounted on a vertical shaft 116 supported in an upper and a lower shaft bracket 118 is attached to the outside of barn wall 64 in the same horizontal plane as the pulley 112. A suitable belt 120 travels over the said mainshaft pulley 112, through a barn wall slot 122 and over the horizontal pulley 114 attached to the exterior of the barn wall 64.

At the base of the vertical shaft 116 is a horizontally rotating bevel gear 124 that engages a vertically rotating bevel gear 126 fixedly mounted at the end of a horizontal shaft 128. Said horizontal shaft 128 is supported in a shaft supporting bracket 130 and has a vertically rotating pulley 132 fixedly mounted at its opposite end.

A belt 134 travels over said vertically rotating pulley 132 and over a pulley 135 rotating on the motor shaft 136 of an electric motor 138, which is the source of power for rotating the mainshaft 74. While I have located the turning means outside the curing barn B, it will be appreciated this can be installed in any convenient location.

After the tobacco leaves have been cured, the chain of leaves 60 on the lowest frame 88 may be unwound and collected in any suitable container, such as a hogshead, or on a short board or reel. The spoke arms 82 of the empty frame 88 may then be disconnected from the hub 80. A pull of the raising side of the hoisting rope 92 will disengage the supporting collar locking cam 102 from the mainshaft 74 and the next lowest leaf frame 88 may then be controllably lowered to a position where it can be locked by pin 90 in working position and relieved of its cured leaves. After the curing operation, it is comparatively easy to pack the leaves for grading and storing by unwinding the hanging leaf chains and exposing all the leaves to view.

The empty frame racks are then dismantled by removing the individual spokes 82 from the hub 80. The spokes 82 are stored until required again. The hub 80 remains slidably attached to the mainshaft 74 at the base of said mainshaft 74. This process is repeated until all leaf frame racks 82 have been relieved of their leaf chains 60 and the hubs 80 rest, one on the other, at the bottom of the mainshaft 74.

While I have employed a circular barn for purposes of illustrating my invention, it will be appreciated that a barn of sufficient size may assume any other form.

A valuable feature of this invention is the fact that several such mainshafts 74 may be erected in currently existing barns, depending upon their size, without necessitating large expenditures for the construction of new barns.

From the foregoing description, it will be apparent that the apparatus herein provides for the efficient storage, handling and curing of green tobacco and dispenses with the need for curing sticks.

The invention hereinabove described may therefore be varied in construction within the scope of the claims, for the particular device selected to illustrate the invention is but one of many possible embodiments of the same. The invention, therefore, is not to be restricted to the precise details of the structure shown and described.

What is claimed is:

1. A device for joining, handling and curing green tobacco leaves, comprising a conveyor for receiving green tobacco leaves, a stitcher for joining said leaves into a chain, a plurality of leaf support frames, attaching means formed on said leaf frames to receive and support said leaf chain, mechanism for storing said leaf filled frames overhead and at intermediate heights one spaced above the other, a housing for enclosing said stored leaf filled frames, and a source of heat within said housing for curing said tobacco leaves.

2. A device for joining, handling and curing green tobacco leaves, comprising a tobacco leaf conveyor, a leaf spacer, a binder for joining said spaced tobacco leaves in a chain, a leaf frame having supports on its underside to receive said chain of tobacco leaves, frame supporting structure to support several leaf laden frames, an enclosure housing said supported frames, and heating apparatus within said housing to cure said tobacco leaves.

3. A method for joining, handling and curing green tobacco leaves which comprises advancing tobacco leaves along a predetermined path while disposed flatwise and having their stems facing in the same direction to a stitching area, stitching the leaves together to form a continuous chain at such area, securing said chain of leaves to the underside of a leaf frame in a curing barn, raising said leaf frame to a position overhead when it is loaded with stitched leaves, positioning other similarly leaf laden frames to points intermediate and at different levels, and curing said supported tobacco leaves within a heated curing barn.

4. A device for handling, joining and curing green tobacco leaves, comprising a leaf collector, a leaf stem aligner, a stitcher to join said aligned stems in a continuous chain, frames to support said continuous chain of joined leaves, and a heated chamber in which to receive and store the said tobacco leaf chain.

5. A device for joining, handling and curing green tobacco leaves, comprising means for stringing tobacco leaves into chains, supporting frames for receiving and supporting said chains of leaves in a spiral arrangement and mechanism to revolve said frames supporting said green tobacco leaves to facilitate obtaining a uniform cure of said leaves.

6. In the process of joining, handling and curing green tobacco leaves, the steps of spacing tobacco leaves whose stems all face one direction, stitching the leaves to form a chain, attaching the leaf chain to supporting structure, and revolving the structure within an enclosed, heated area to evenly cure said leaves.

7. A device for joining, handling and curing green tobacco leaves comprising a conveyor to receive advancing green tobacco leaves all with their stems in the same direction, a stitcher to join the leaves in a continuous chain, a plurality of leaf frames provided with supports on their undersides, supporting parallel horizontal racks in front of said stitcher, said leaf frame supports being adapted to secure and hold a chain of hanging tobacco leaves and heating means for curing green tobacco leaves.

8. A device for joining, handling and curing green tobacco leaves, comprising a conveyor to receive advancing green tobacco leaves, a leaf stitcher to join said tobacco leaves in a chain, a plurality of leaf supporting frames adapted to support said joined leaves, a plurality of leaf frame hubs adapted to engage and support said frames, a vertical shaft adapted to slidably receive and engage said hubs, and means for curing said green tobacco leaves surrounding said vertical shaft and supported leaves.

9. A device for joining, handling and curing green tobacco leaves, comprising a conveyor to receive green tobacco leaves, a leaf binder to tie the leaves in a chain, a plurality of hubs, removable leaf supporting spokes adapted to be connected to said hubs, a vertical shaft adapted to slidably receive and engage said hubs, and a hot chamber for curing said tobacco leaves surrounding said shaft and supported leaves.

10. A device for joining, handling and curing green tobacco leaves, comprising a conveyor to receive green tobacco leaves, a leaf binder adapted to receive tobacco leaves from said conveyor and bind same into chains of leaves, a plurality of leaf supporting frames adapted to receive and support said chains, a rotatable shaft adapted to slidably receive and support said leaf supporting frames and a heated chamber surrounding said shaft and supported leaves arranged to dry said tobacco leaves.

11. A device for joining, handling and curing green tobacco leaves, comprising a conveyor to receive green tobacco leaves, a leaf binder to form chains of leaves, a plurality of leaf frames for supporting the leaf chains, a device for raising, locking into position and lowering said leaf frames and a heated chamber in which to store the tobacco leaf chains.

12. The method of handling, joining and curing green tobacco leaves, comprising the steps of supporting leaves at their stem ends on horizontal frameworks, arranging said leaf supporting frames in superimposed, spaced tiers, rotating said superimposed tiers, and submitting said superimposed tiers to curing heat to expose all of the leaves to substantially the same curing conditions.

13. A device for the even curing of green tobacco leaves, comprising a conveyor to receive green tobacco leaves, a leaf binder for uniting said leaves into continuous chains, a plurality of vertically movable leaf frames for supporting said leaf chains, means for elevating and lowering said leaf frames, a source of heat for curing said leaves when in elevated position, and a device for revolving said leaf frames during curing.

14. A device for joining, handling and curing green tobacco leaves, comprising a leaf conveyor, a device for joining the leaves at their stem portions into continuous leaf chains, a plurality of vertically movable leaf frames to support said continuous leaf chains, means for raising, locking into position and lowering said leaf frames, a source of heat to cure the tobacco leaves, and an enclosure supporting the vertically movable and rotatable leaf frames.

15. A device for joining, handling and curing green tobacco leaves comprising a conveyor to receive green tobacco leaves, a leaf binder to tie the leaf stems into continuous chains, a plurality of leaf frames for supporting the leaf chains, a device for raising and lowering said leaf frames, a friction member to lock said leaf frames at desired levels and a heated room in which the tobacco is cured.

16. A device for handling and curing tobacco leaves comprising a housing, a post extending up and down in said housing, leaf supporting frames mounted for up and down movement on said post, a table associated with said housing, a chain former on said table for joining leaves to form a chain of leaves, attaching means for securing said chain to the underside of each of said frames, means for raising each frame on said post after it is loaded with leaves, a releasable lock for securing each loaded frame at an elevated position on said post and means to cure the green tobacco leaves.

References Cited in the file of this patent

UNITED STATES PATENTS

| | | |
|---|---|---|
| 791,803 | MacLean | June 6, 1905 |
| 2,229,546 | Bogaty | Jan. 21, 1941 |
| 2,280,705 | Hurxthal | Apr. 21, 1942 |